United States Patent [19]

Baldwin et al.

[11] Patent Number: 4,797,755
[45] Date of Patent: Jan. 10, 1989

[54] SYSTEM AND METHOD FOR TRANSFERRING DATA BETWEEN A PLURALITY OF DISKS AND A MEMORY

[75] Inventors: David R. Baldwin, Sheppston, United Kingdom; Shingo Sata, Otawara, Japan

[73] Assignee: Kabushiki Kaisha Toshiba, Kanagawa, Japan

[21] Appl. No.: 914,471

[22] Filed: Oct. 2, 1986

[30] Foreign Application Priority Data

Oct. 2, 1985 [JP] Japan ................. 60-217968

[51] Int. Cl.⁴ .............................................. G11B 5/09
[52] U.S. Cl. ........................................ 360/49; 360/48
[58] Field of Search ............................ 360/39, 48, 49

[56] References Cited

U.S. PATENT DOCUMENTS

| 3,701,130 | 10/1972 | Ault ..................... 360/49 |
| 4,279,004 | 7/1981 | Yamashita et al. ........ 360/49 |
| 4,494,157 | 1/1985 | Ina et al. ............... 360/49 |
| 4,504,873 | 3/1985 | Bandy et al. ............ 360/49 |
| 4,584,617 | 4/1986 | Libove et al. ........... 360/39 |
| 4,590,559 | 5/1986 | Baldwin et al. . |
| 4,656,532 | 4/1987 | Greenberg et al. ........ 360/48 |

FOREIGN PATENT DOCUMENTS 61-139978  6/1986  Japan ............................. 360/49

Primary Examiner—Alan Faber
Assistant Examiner—Surinder Sachar
Attorney, Agent, or Firm—Finnegan, Henderson, Farabow, Garrett & Dunner

[57] ABSTRACT

A system for data transfer includes a plurality of disks each having surfaces divided into sectors in which data may be stored; drive mechanisms for rotating the disks; a plurality of data transfer heads, one transfer head associated with each disk surface; sector determining circuitry for determining the current sector of each disk surface relative the associated head; and control circuitry responsive to the sector determining circuitry, for initiating transfer of data between the head and the associated disk surface whenever the head for that surface is at the beginning of any sector involved in the data transfer. The system further includes a memory; and a data bus coupled to the memory; a buffer coupled between each of the heads and the data bus. The control circuitry is able to determine correspondence between a location in the memory and a sector of the disk surfaces for data involved in the transfer, so as to permit individual transfer of data between a head and associated disk surfaces for each sector involved in the transfer in an order that is independent of the order of the data in the memory. A related method is also disclosed.

10 Claims, 5 Drawing Sheets

Fig. 4.

| TIME | | | | | | | | | | |
|---|---|---|---|---|---|---|---|---|---|---|
| DRIVE 60-0 | CURRENT SECTOR | 6 | 7 | 0 | 1 | 2 | 3 | 4 | 5 | 6 |
| | READ | 6 | 7 | | | | | | 5 | 6 |
| DRIVE 60-1 | CURRENT SECTOR | 13 | 14 | 15 | 8 | 9 | 10 | 11 | 12 | 8 |
| | READ | 13 | 14 | 15 | 8 | 9 | 10 | 11 | 12 | |
| DRIVE 60-2 | CURRENT SECTOR | 18 | 19 | 20 | 21 | 22 | 23 | 16 | 17 | 18 |
| | READ | | | | | | | 16 | 17 | |
| TRANSFER SECTOR TO MEMORY (MEMORY ADDRESS) | DRIVE 60-1 | 13 (540) | 14 (544) | 15 (548) | 8 (520) | 9 (524) | 10 (528) | 11 (532) | 12 (536) | |
| | DRIVE 60-0 | 6 (512) | 7 (516) | | | | | | | |
| | DRIVE 60-2 | | | | | | | 16 (552) | 17 (556) | |

Fig. 5

| TIME | | | | | | | | | | |
|---|---|---|---|---|---|---|---|---|---|---|
| DRIVE 60-0 CURRENT SECTOR | 6 | 7 | 0 | 1 | 2 | 3 | 4 | 5 | 6 | --- |
| SECTOR NO. SUPPLY DATA RECEIVE | 7 (516) | | | | | | | 6 (512) | | |
| WRITE | | 7 | | | | | | | 6 | |
| DRIVE 60-1 CURRENT SECTOR | 13 | 14 | 15 | 8 | 9 | 10 | 11 | 12 | 13 | --- |
| SECTOR NO. SUPPLY DATA RECEIVE | 14 (544) | 15 (548) | 8 (520) | 9 (524) | 10 (528) | 11 (532) | 12 (538) | 13 (540) | | |
| WRITE | | 14 | 15 | 8 | 9 | 10 | 11 | 12 | 13 | |
| DRIVE 60-2 CURRENT SECTOR | 18 | 19 | 20 | 21 | 22 | 23 | 16 | 17 | 18 | |
| SECTOR NO. SUPPLY DATA RECEIVE | | | | | | 16 (552) | 17 (556) | | | |
| WRITE | | | | | | | 16 | 17 | | |

SYSTEM AND METHOD FOR TRANSFERRING DATA BETWEEN A PLURALITY OF DISKS AND A MEMORY

BACKGROUND OF THE INVENTION

Field of the Invention

This invention relates generally to a data transfer system and related transfer method, and more specifically to a data transfer system and related method for transferring data between a main memory and a plurality of disk drives which may be asynchronously rotated.

II. Background Information

Conventional memory systems for large computers typically include a main memory and several magnetic disks on disk drives. Main memory comprises the fast portion of a typical large computer memory system. Accordingly, data which must be manipulated is stored in main memory. Afterwards, the manipulated data is stored in the magnetic disks. For example, image data is first received from a data input source, manipulated in main memory, and stored in magnetic disks from which the data may be returned to main memory where the data is readied for image display on a cathode ray tube display device or the like.

Disk drives typically comprise several magnetic disks which are mounted horizontally on a rotating shaft. The shaft rotates the several disks adjacent read/write heads which write data into the surfaces of the rotating disks or read data from the surfaces of the disks. For example, five such disks may be stacked in a single shaft and rotated at a constant speed.

Each of the disks has two surfaces, an upper and a lower surface, each rotating adjacent an associated head. The surfaces of the disks include concentric circular tracks, referred to as cylinders. Each of the disks on a particular disk drive have the same number of cylinders, and the heads adjacent the disks of the disk drive at any given time are all situated adjacent cylinders which are at the same radial distance from the center of the disk. The cylinders of the disk surfaces are divided into discrete radial portions referred to as sectors. The sectors have a given memory capacity specified by byte size. Typically, a disk surface may have 823 concentric circular tracks or cylinders and each cylinder may have 35 sectors each having a memory capacity of 512 bytes.

Data to be stored on the magnetic disks of the disk drives is transferred between or, more specifically, written from the main memory to the sectors of the cylinders of the disks for later retrieval when needed. The stored data, when needed, is transferred between or, more specifically, read from the sectors of the cylinders to the main memory. The data is then available for use from the main memory by units such as an image processing unit. Generally, the time taken for reading data from, and writing data into disks is fairly long in comparison with the time required to transfer data between a head and the main memory.

A disk data transfer system is used to transfer data between the main memory and the disk drives. The typical data transfer system includes a transfer control unit, disk drive interfaces, and a main memory access unit which are implemented so as to transfer disk data quickly between corresponding memory locations and cylinder sectors.

Typically, the transfer control unit receives transfer commands which indicate the direction of the transfer (from disk drives to main memory (read) or from main memory to disk drives (write)). The transfer control unit also receives control signals indicating the beginning or leading main memory location for the transfer, the leading disk drive sector for the transfer and the number of sectors of data for the transfer. The transfer control unit processes the leading sector and the number of sectors to determine the leading sectors and number of sectors for each of the disk drives.

For each disk drive there exists a disk drive interface. Each disk drive interface interconnects a disk drive with the transfer control unit. Each disk drive interface receives the leading sector and the number of sectors for that disk drive with which that interface is connected. The disk drive interface polls that disk drive to determine if the sector of the cylinder which is currently rotating adjacent the recording head, that is, the current sector, matches the leading sector as received from the transfer control means. If the current sector is not the same as the leading sector, the disks continue to rotate, uneventfully. When the current sector matches the leading sector, a data transfer is initiated in the transfer direction as received by the transfer control unit. Data transfer continues for each drive until the number of sectors to be transferred between main memory and each disk drive have been transferred.

The disk data is typically held by the interface as the data is transferred between the disk drive and the main memory.

The main memory access unit links the disk drive interfaces to the main memory so that the disk data can be transferred between the disk drive interfaces and the main memory. The main memory access transfers disk data to and from main memory locations according to the leading main memory location for the transfer. The leading main memory location is provided by the transfer control means. All data is received by the main memory access unit, from the disk interfaces for a read transfer or from the main memory for a write transfer, in the same order as the data is to be received by the main memory or the disk interfaces, respectively.

In a conventional memory system, the disk drives are arranged in parallel The parallel arrangement of the disk drives permits a disk data transfer system to achieve improved data transfer speed. Additionally, data transfer system may be implemented using asynchronously rotating disk drives as disclosed in U.S. Pat. No. 4,590,559 to Baldwin et al., since synchronizing rotation of disk drives is difficult to achieve and results in lowered data transfer speed.

As has been described, the known disk data transfer systems do not initiate data transfer until the leading sector is under the recording head.

The effect of awaiting the leading sector in order to initiate data transfer to ensure the proper ordering of disk data is to cause the transfer system to ignore transfer sectors (i.e., sectors to which or from which data is to be transferred) rotating under the recording heads before the leading transfer sector. This arrangement impedes the speed of data transfer.

Accordingly, an object of the present invention is to provide a disk data transfer system and related method which may more quickly and efficiently transfer data between main memory and the disk drives.

Additional objects and advantages of the invention will be set forth in the description which follows, and in part will be obvious from the description or may be learned by practice of the invention.

SUMMARY OF THE INVENTION

To achieve the foregoing objects, and in accordance with the purpose of the invention as embodied and broadly described herein, there is provided a system for data transfer, comprising: a plurality of disks each having surfaces divided into sectors in which data may be stored; drive means for rotating the disks; a plurality of data transfer heads, one transfer head associated with each disk surface; sector determining means for determining the current sector of each disk surface relative the associated head; and control means responsive to said sector determing means, for initiating transfer of data between said head and said associated disk surface whenever said head for that surface is at the beginning of any sector involved in said transfer.

It is further preferable that the system for data transfer further comprise: a memory; a data bus coupled to the memory; a buffer coupled between each of the heads and the data bus; and wherein the control means includes means for determining a correspondence between a location in the memory and a sector of the disk surfaces for data involved in the transfer to permit individual transfer of data between a head and associated disk surfaces for each sector involved in the transfer in an order independent of the order of the data in the memory.

The method of the subject invention for data transfer comprises the steps of: determining which of a plurality of rotating disks are involved in the transfer; determining which sector of each disk is currently under a head associated with that disk; and initiating transfer of data between a head and associated disk whenever the head is at the beginning of any of the sectors involved in the transfer.

The method of the subject invention may preferably comprise the steps of: determining a correspondence between memory locations of a memory and sectors of a plurality of disks which are involved in the transfer; transferring data involved in the transfer between the memory locations and a buffer; and initiating transfer of the data between the buffer and a disk, through an associated head, whenever the head is at the beginning of any of the sectors involved in the transfer in an order independent of the order in which the data is stored in the memory.

BRIEF DESCRIPTION OF THE DRAWINGS

FIG. 4 is a diagram illustrating the read operation for the preferred embodiment of the invention; and FIG. 5 is a diagram illustrating the write operation for the preferred embodiment of the invention.

DESCRIPTION OF THE PREFERRED EMBODIMENT

Figure 1:
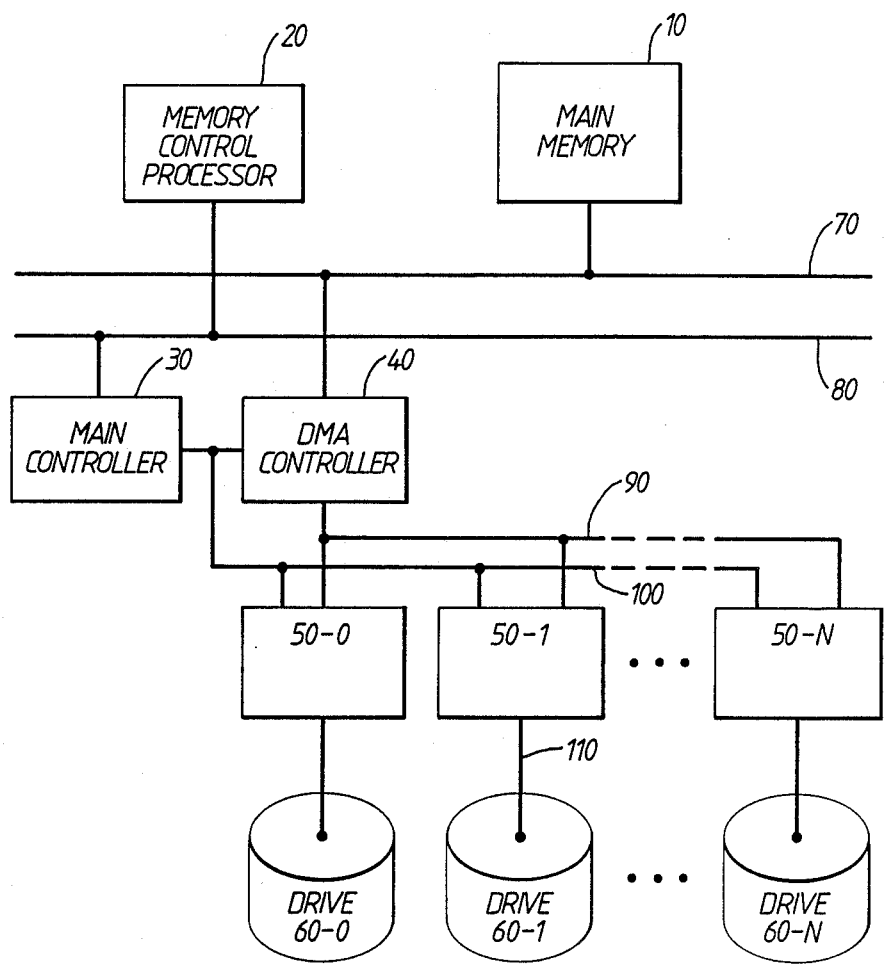
FIG. 1 is a general block diagram of a system for data transfer incorporating the teachings of the subject invention.

Referring to FIG. 1, a system for data transfer incorporating the teaching of the subject invention is shown. The system for data transfer is illustrated as including main memory 10, memory control processor 20, main controller 30, direct memory access (DMA) controller 40, disk drive interfaces 50-0 through 50-N, and disk drives 60-0 through 60-N. Also shown are data buses 70, 90 and 110, and control buses 80 and 100.

Main memory 10 is connected to (DMA) controller 40 by data bus 70. A data link exists between DMA controller 40 and each disk drive interface 50 through data bus 90. Disk drive interfaces 50-0 through 50 N are each data-linked to a respective disk drive 60-0 through 60-N by a respective data bus 110.

Memory control processor 20 is connected to main controller 30 by control bus 80. A control link exists between main controller 30 and DMA controller 40 through control bus 100. Control bus 100 also provides a control link connecting main controller 30 and DMA controller 40 with disk drive interfaces 50-0 through 50-N.

Memory control processor 20 responds to read/write input commands which are received by memory control processor 20 from an outside control unit not shown. In response, memory control processor 20 transfers a read/write signal to main controller 30 through control bus 80. Along with a read/write signal, memory control processor 20 transfers to main controller 30 an address for a leading location in main memory 10 from which or to which a data block will transfer, an address for a leading sector on cylinders of the disks of disk drives 60-0 through 60-N, and a number indicating the amount of data for transfer. The number indicating the amount of data for transfer is specified according to the number of sectors of the disk cylinders that the given amount of data for transfer will occupy, i.e., 100 sectors of data.

Main controller 30 processes the received control information (leading memory location address, leading sector, amount of data) and determines a leading sector, a disk surface number and amount of transfer data for each of disk drives 60-0 through 60-N involved in the transfer. Main controller 30 transfers the leading sector, disk surface number and amount of data for transfer for each involved disk to the disk drive interfaces 50 connected to the respective disk drives 60. Main controller 30 also transfers the read/write signal to each disk drive interface 50. The information transfered from main controller 30 to disk drive interfaces 50-0 through 50-N is transferred over control bus 100. Similarly, the leading memory location address is transferred from main controller 30 to DMA controller 40 over control bus 100.

In response to receiving a read/write signal, disk drive interfaces 50-0 through 50-N read the number of the sector adjacent which read/write heads for each of respective disk drives 60-0 through 60-N are positioned, that is, the current sector number. Disk drive interfaces 50-0 through 50-N also determine a range of transfer sectors using the leading sector number and the number of sectors of data for transfer. The range of transfer sectors for any disk drive 50 may include, for example, the leading sector and the sectors immediately following the leading sector, with the total number of such consecutively ordered sectors being equal to the number of transfer sectors for that particular disk drive 60.

Disk drive interfaces 50-0 through 50-N compare the current sector numbers with the sector numbers of the sectors within the determined range of transfer sectors. When the current sector number compares positively with any of the sector numbers for the sectors within the transfer range, disk drive interfaces 50-0 through 50-N then send transfer requests to DMA controller 40 in order to read the transfer data into or write the transfer data from the cylinder sectors of the disks on disk drive 60-0 through 60-N.

DMA controller 40 polls disk drive interfaces 50 for transfer requests. DMA controller 40 receives the transfer requests through data bus 90. When a transfer requests indicates that data is to be transferred to disk drives 60, i.e., written, DMA controller 40 reads from the disk drive interfaces 50 which sent the transfer requests to determine the transfer sectors to which data will be written. DMA controller 40 calculates the corresponding locations in main memory 10 storing the data to be written to disk drives 60 utilizing the leading memory location address provided by main controller 30. As an example, both the memory locations and disk sectors for the transfer may be consecutively ordered beginning at the leading location and sector, respectively. In such case, consecutively ordered blocks of data from the memory locations in main memory 10 may be transferred to corresponding consecutively ordered sectors in disk drives 60.

When reading data from disk drives 60, DMA controller 40 transfers data from the sectors of disk drives 60 to the corresponding addresses in main memory 10.

The transfer capacity of data bus 90 may be, for example, 20 Megabytes/sec. The transfer capacity of disk drives may only be, for example, 1 Megabyte/sec. In order to prevent overrun and underrun of data, therefore, a maximum of 20 disk drives 60 could be operated. This arrangement would permit each of disk drives 60 to transfer data once during the operating cycle for data bus 90.

Figure 2:
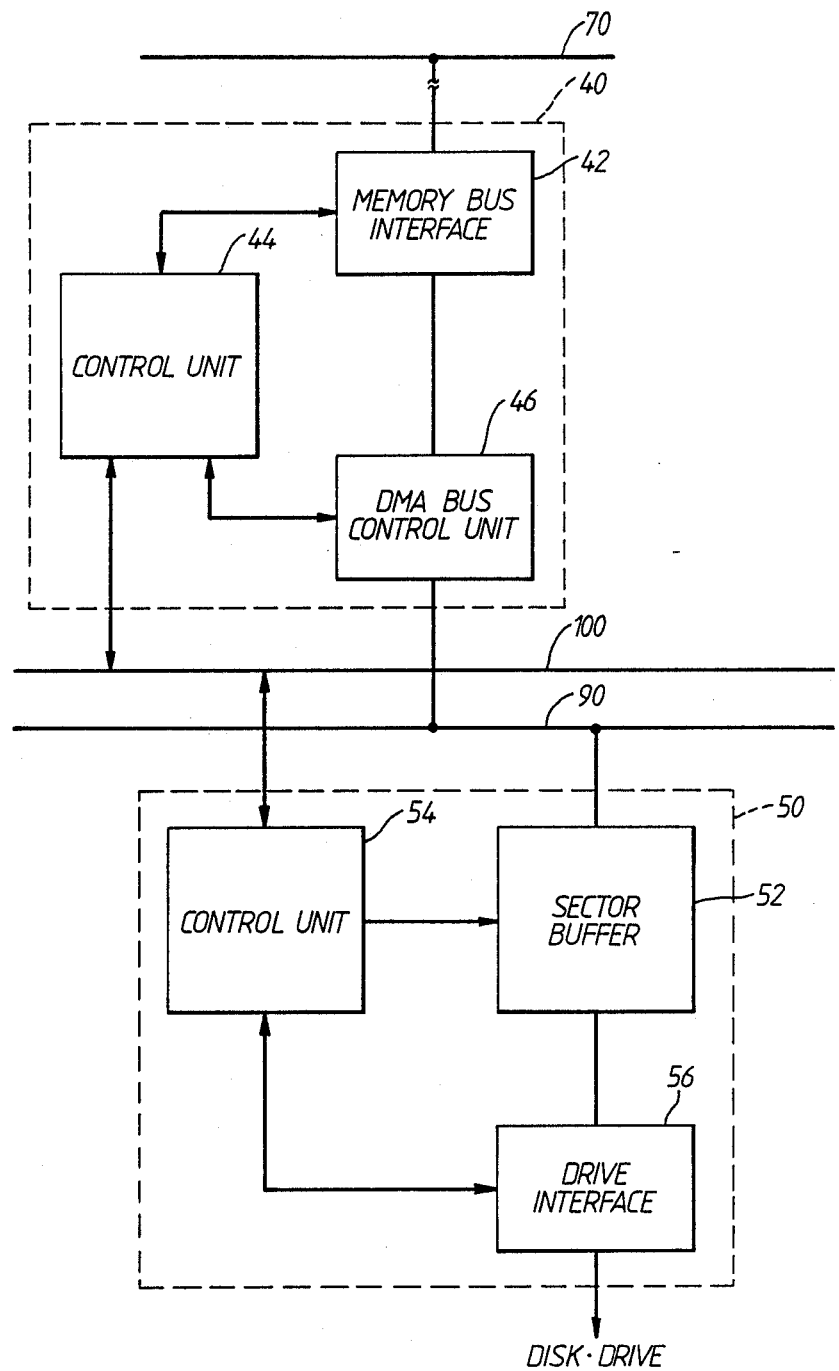
FIG. 2 is a more detailed schematic block diagram of the direct memory access controller and disk drive interfaces of FIG. 1.

FIG. 2 is an exemplary illustration of DMA controller 40 and a disk drive 50. DMA controller 40 is shown to comprise memory bus interface 42, control unit 44 and DMA bus control unit 46. Disk drive interface 50 is shown to include sector buffer 52, 20 control unit 54 and drive interface coupler 56.

Memory bus interface 42 of DMA controller 40 is connected with data bus 70. Memory bus interface 42 is also connected to control unit 44 and DMA bus control unit 46. Control unit 44 is connected to DMA bus control unit 46 and to control bus 100. DMA bus control unit 46 is connected to data bus 90.

Control unit 44 calculates the addresses of the memory locations of main memory 10 from which data will be read or to which data will be written (write, read respectively). The calculation is performed using the leading memory location which is transferred to control unit 44 on control bus 100, and the transfer sector numbers transferred from disk drive interfaces 50 on data bus 90 through DMA bus control unit 46.

DMA bus control unit 46 receives transfer requests from disk drive interfaces 50-0 through 50 N over data bus 90, and controls transfer of data between sector buffer 52 of the disk drive interfaces 50.

Control unit 54 of disk drive interface 50 is connected to control bus 100 and to sector buffer 52 and drive coupler 56. Sector buffer 52 is connected to data bus 90 and drive coupler 56. Drive coupler 56 is connected to disk drive 60 through data bus 110.

Sector buffer 52 may store two sectors of data (i.e., data that occupies two sectors in disk drives 60) for transfer. Sector buffer 52 may simultaneously hold a sector of data transferring between disk drive interface 50 and disk drive 60, and a sector of data transferring between disk drive interface 50 and main memory 10.

Control unit 54 receives a disk surface number from main controller 30, indicating which disk surface will be used in the data transfer, and control unit 54 causes drive interface 56 to select the proper disk surface to perform the read or write and to position the head to allow the current sector number of the disk surface to be determined by control unit 54. The current sector number is transferred to control unit 54 through drive coupler 56. When the current sector number as read by control unit 54 is within the range of transfer sectors determined also by control unit 54, control unit 54 directs sector buffer 52 to transfer data through disk coupler 56.

More specifically, when main controller 30 directs disk drive interface 50 to write data to disk drive 60, control unit 54 determines whether the sector immediately following the current sector is within the range of transfer sectors. Control unit 54 sends a transfer request to DMA controller 40 to transfer data through data bus 70 if the sector immediately following the current sector is in the transfer sector range. The data for transfer is transferred from main memory 10 to sector buffer 52 where the data is stored until the sector immediately following the current sector is rotated under the write head over the disk surface.

When main controller 30 directs disk drive interface 50 to read data from disk drive 60, control unit 54 determines whether the current sector is within the range of transfer sectors. The data within a current sector within the range of transfer sctors is transferred through drive coupler 56 to sector buffer 52. DMA controller 40 then calculates the appropriate memory location to which the data is to be transferred and transfers the data to main memory 10 over data bus 70.

Figure 3:
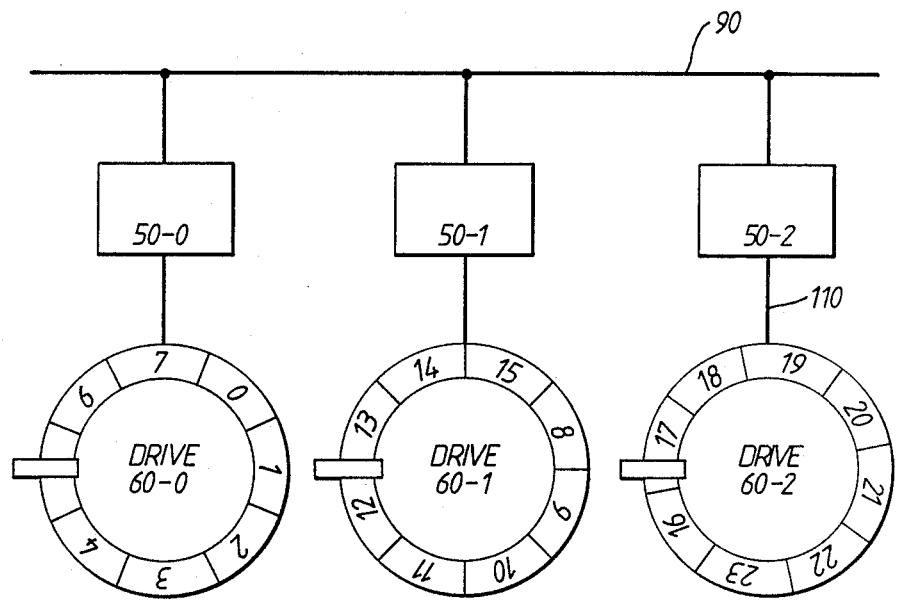
FIG. 3 is a schematic illustration of the disk drive interfaces and disk drives of FIG. 1.

A schematic illustration of the operation of a preferred embodiment of the present invention is set forth in FIG. 3. Time charts, as shown in FIG. 4 and FIG. 5, further illustrate the preferred embodiment described.

FIG. 3 shows disks of disk drives 60, and interfaces 50. Three drives 60-0, 60-1, 60-2 are shown with corresponding disk drive interfaces 50-0, 50-1, and 50-2. For purposes of illustration, the disk drives are depicted as having a single disk with a single cylinder and 8 sectors.

The operation of the transfer system is first described for the read operation. MCP 20 (see FIG. 1) supplies main controller 30 with a read command. Main controller 30 also receives a leading address, for example, 512, a leading sector, for example, 6 and a number of transfer sectors such as 12. Main controller 30 calculates a cylinder number such as cylinder 1 and also a disk number, as for example, disk 1. Main controller 30 then calculates the number of transfer sectors for each of the single disks of disk drives 60-0 through 60-2. In the present example, main controller 30 with a leading sector 6 and 12 sectors of data to transfer would cause 2 sectors of data to be read from drive 60-0, sectors 6 and 7, the data being read from the leading sector and the next successive sector in the order of numbered sectors.

Eight sectors would be read from disk drive 60-1 starting at leading sector 8 and continuing around the cylinder to sector 15.

For disk drive 60-2 main controller 30 provides leading sector number 16. Since 10 of 12 transfer sectors are to be read from disk drives 60-0 and 60-1 only two sectors remain to be read from disk drive 60-2. Leading sector 16 and the next sector 17 are designated.

For the present example, the range of transfer sectors is from sector 6 to sector 7, 2 sectors, for the disk of disk drive 60-0. For the disk of disk drive 60-1 the transfer range is from sector 8 to sector 15, 8 sectors. And for disk drive 60-1 the transfer range includes 2 sectors, sectors 16 and 17. It will be understood that this example here described is simplified, and also that the overall concept of the invention includes other ways for determining transfer sectors.

In the preferred embodiment described, the disks of drives 60-0, 60-1 and 60-2 are rotated asynchronously. At a point in time the read/write heads of drives 60 may be situated over the disks as shown in FIG. 3. In FIG. 3 for the instant depicted, the head of disk drive 60-0 is presently over sector 5. The heads of disk drives 60-1 and 60-2 are over sector 13 and 17, re- spectively.

The reading of data using asynchronous rotation of the disks of disk drives 60 is further illustrated in FIG. 4. As shown, sector 13 of the disk of disk drive 60-1 is the first sector, the beginning of which rotates under a read/write head. Accordingly, sector number 13 is the first current sector read by interface r 50-1. Since sector 13 is a transfer sector, a transfer request is sent by disk drive interface 50-1 to DMA controller 40. The next sector, the beginning of which rotates under a read/write head, is sector 6 of disk drive 60-0. Sector 6 is also a transfer sector and, therefore, a transfer request is forwarded to DMA controller 40 by disk drive interface 50-1.

The next current sector read is sector 18 of the disk of disk drive 60-2. Current sector 18 is not a transfer sector. Disk drive inteface 50-2 neglects sector 18, that is, disk drive interface 50-2 does not send a transfer request to DMA controller 40 for sector 18.

The address of the main memory locations to which data is to be transferred when read from disk drive 60 is calculated by DMA controller 40 using the leading address of memory locations in main memory 10. In the present example, the leading memory location is 512. Each memory location holds a byte or a block of data. Further, the exemplary sectors of disk drives 60 each have a data capacity of 4 bytes or blocks. For the present example, successive 4-byte units of data (a sector of data) starting with the leading sector 6 are transferred to corresponding successive locations in main memory 10. For example, starting with leading sector 6, sector 13 is the eighth transfer sector of the 12 sectors of data to be read. Therefore, sector 13 data must be transferred to a location holding 4 bytes of data and following the first 7 4-byte locations. The transfer address for sector 13 is given by the equation $$512+(4\times 7)= \text{location for sector 13 data,}$$

where 512 is the leading address, 7 is the number of transfer sectors preceding sector 13 and 4 is the number of bytes in each sector. Accordingly, the address in main memory 10 to which data from sector 13, for example, is transferred is 540.

In the manner described above, DMA controller 40 calculates the corresponding memory location in main memory 10 to which each of the sectors of disk drives 60 will be transferred. DMA controller 40 reads the data from sector buffer 52 of interface 50 and then transfers the data to main memory 10 over memory bus 70.

DMA controller 40 receives a transfer sector number, calculates the corresponding main memory address and transfers the data to main memory at a rate 3 to 4 times faster than the rate at which data is read from disk drives 60. Therefore, data from sectors 13 and 6, for example, are written to main memory 10 before the next current sector is read by disk drive interface 50.

Since each sector of data for transfer is transferred as the transfer sector is rotated under the head, a complete transfer for the sectors of a disk takes place within one rotation of the disks of the disk drives 60. The leading transfer sectors for each disk are used by DMA controller 40 to calculate corresponding main memory locations, but not used by disk drive interfaces 50 to initiate data transfer. Transfer of data starts with any transfer sector rotating under the read/write head. Waiting time for the leading sector to come under the read/write head is therefore eliminated with the present invention.

The writing of data using asynchronous rotation of disk drives 60 is illustrated in FIG. 5. As shown, 48 bytes from leading address 512 up to and including address 559 are to be written from main memory 10 to the disks of disk drives 60-0, 60-1, 60-2.

Main controller 30, in response to a write signal, leading memory and sector addresses and a number indicating the amount of sectors of data for transfer, calculates the disk number (present example involves a single disk), the leading sector for each disk of disk drives 60, and the number of transfer sectors for each disk. As in the earlier described "read" example, the leading sectors are 6, 8 and 16 for disks of drives 60-0, 60-1 and 60-2, respectively. The transfer sector range for each disk of disk drives 60-0, 60-1, and 60-2 are determined by disk drive interfaces 50-0, 50-1 and 50-2, respectively. The ranges are sectors 6 to 7, 8 to 15 and 16 to 17, respectively, for the disks or drives 60-0, 60-1 and 60-2.

As indicated in FIG. 5, the current sectors starting with current sector 13 of disk drive 60-1, are read by disk drive interfaces 50. When the next sector, e.g., sector 14, is within the transfer sector range, a transfer request is sent to DMA controller 40. Similarly, a transfer request for disk drive 60-0 is sent to disk drive interface 50-0 because sector 7 which immediately follows current sector 6 is within the transfer range. Sector 19 of disk drive 60-2 is not within the transfer sector range. Therefore, when current sector number 18 of disk drive 60-2 is read by disk drive interface 50-2, no transfer request is sent to DMA controller 40.

Using the sector number which immediately follows the current sector and the leading address, DMA controller 40 calculates the memory location from which data to be transferred must be retrieved. The data for the transfer sector immediately following the current sector is transferred through DMA controller 40 over data bus 70 to sector buffer 52.

As seen, the transfer sector immediately following the current sector 13 is sector 14. Using the leading memory location, the location from which data to be written to sector 14 can be determined. Where the leading memory location is 512, the number of bytes per sector is 4, and sector 13 is the eighth transfer sector, the memory location from which data is to be transferred is given by the equation $$512+(4\times 8)=544.$$

Thus data at memory locations 544, 545, 546 and 547 will be written to sector 14 of disk drive 60-1. The data will be written from sector buffer 52 when the current sector number for disk drive 60-1 is 14.

Disk interfaces 50 supply transfer requests to DMA controller 40, and receive data to be written to disk drives 60 at a rate 3 to 4 times faster than the rate at which data is written to disk drives 60. Therefore, data for sectors 14 and 7, for example, are written before the next current sector numbers, 14 and 7 are read by disk drive interface 50.

Since for the write operation as for the read operation, each sector of data for transfer is transferred as the sector is rotated under the head, a complete transfer for the transfer sector of a disk takes place within one rotation of the disks of disk drive 60.

It should be understood that the apparatus illustrated in FIGS. 1-3 and as further described using FIG. 4 and FIG. 5 are merely illustrative of the teachings of the subject invention. Thus disk drive interfaces 50 and DMA controller 40 may take on different specific forms other than those illustratively disclosed with regard to the system for data transfer of Figures 1-3, and yet fully incorporate the teachings of the subject invention.

In view of the foregoing, it should be understood that in addition to disclosure of a system for data transfer, a related method also has been disclosed comprising the steps of: determining which of a plurality of rotating disks are involved in the transfer; determining which sector of each disk is currently under a head associated with that disk; and initiating transfer of data between a head and associated disk whenever the head is at the beginning of any of the sectors involved in the transfer.

And further a method has been disclosed for transferring data preferably comprising the steps of: determining a correspondence between memory locations of a memory and sectors of a plurality of disks which are involved in the transfer; transferring data involved in the transfer between the memory locations and a buffer; and initiating transfer of the data between the buffer and a disk, through an associated head, whenever the head is at the beginning of any of the sectors involved in the transfer in an order independent of the order in which the data is stored in the memory.

Thus the transferring scheme of the subject invention does not require that initiation of data transfer await a leading sector. Data transfer is initiated when any transfer sector is available, thus eliminating delays as experienced with conventional transfer systems and corresponding conventional methods.

It should be apparent to those skilled in the art that various modifications may be made to the system for data transfer and related method of the subject invention without departing from the scope or spirit of the invention. Thus, it is intended that the invention cover modifications and variations of the invention, provided they come within the scope of the appended claims and their legally entitled equivalents.

We claim:

1. A system for data transfer comprising:
   a memory;
   a data bus coupled to said memory;
   a plurality of disks each having surfaces divided into sectors in which data may be stored;
   drive means for rotating said disks;
   a plurality of data transfer heads, one said transfer head associated with each disk surface;
   sector determining means for determining the current sector of each disk surface relative to the associated head;
   a buffer coupled between each of said heads and said data bus; and
   control means responsive to said sector determining means for transferring data between said head and said associated disk surface whenever said head for that surface is at the beginning of any sector involved in said transfer,
   said control means further includes means for determining a correspondence between a location in said memory and a sector of said disk surfaces for data involved in said transfer and for individually transferring data directly with said memory and between said head and said associated disk surface for each sector involved in said transfer in an order independent of the order of said data in said memory.

2. A system of claim 1 wherein:
   said control means includes means for receiving a transfer signal indicative of whether said transfer is a read or write transfer.

3. A system of claim 2 wherein:
   said control means includes means, responsive to a read transfer signal, for transferring data from a head to said buffer whenever that head is at the beginning of any sector involved in said transfer and for thereafter transferring said data from said buffer, over said data bus, to a location in said memory location corresponding to said sector.

4. A system of claim 2 wherein:
   said control means includes means, responsive to a write transfer signal, for transferring data from a location in said memory corresponding to a next sector, over said data bus, to said buffer whenever a head is at the beginning of any sector for which the next sector is involved in said transfer and for thereafter transferring said data from said head to the associated disk surface at the beginning of said next sector.

5. A system of claim 1, 2, 3, or 4 wherein said drive means asynchronously rotates said disks.

6. A method of transferring data comprising the steps of:
   determining a correspondence between memory locations of a memory and sectors of a plurality of disks which are involved in the transfer;
   transferring data involved in said transfer between said memory locations and a buffer corresponding to an individual associated one of said plurality of disks onto which the data is to be transferred; and
   initiating transfer of said data between said buffer and said disk, through an associated head, whenever said head is at the beginning of any of said sectors involved in said transfer in an order independent of the order in which said data is stored in said memory.

7. A method of claim 6 including the steps of:
   determining whether said transfer is a read or a write transfer.

8. A method of claim 7 wherein:
   said step of initiating transfer comprises reading data from said any sector involved in said transfer to said buffer through said associated head in response to determination of a read transfer, and subsequent performance of said step of transferring data comprising reading said data from said buffer to said memory location corresponding to said sector.

9. A method of claim 7 wherein:
   said step of transferring data comprises writing data from said memory, from a memory location corresponding to any next sector involved in said transfer, into said buffer in response to determination of a write transfer and subsequent performance of said step of initiating transfer comprising writing said data from said buffer, through said associated head, into said any next sector involved in said transfer.

10. A method of claims 6, 7, 8 or 9 including the step of asynchronously rotating said disks.

* * * * *